United States Patent [19]
Chaudhary et al.

[11] Patent Number: 6,054,540
[45] Date of Patent: Apr. 25, 2000

[54] VINYL AROMATIC POLYMER COUPLING AND FOAMS

[75] Inventors: Bharat I. Chaudhary, Pearland, Tex.; Andy I. Laiho, Midland, Mich.; Andrew N. Paquet, Saginaw, Mich.; James M. Roe; Clark H. Cummins, both of Midland, Mich.; Michael J. Mullins, Lake Jackson, Tex.; H. Craig Silvis, Midland, Mich.

[73] Assignee: The Dow Chemical Company, Midland, Mich.

[21] Appl. No.: 09/294,504

[22] Filed: Apr. 20, 1999

Related U.S. Application Data

[62] Division of application No. 09/140,586, Aug. 26, 1998
[60] Provisional application No. 60/057,677, Aug. 27, 1997.

[51] Int. Cl.[7] .................................................. C08C 19/22
[52] U.S. Cl. ........................... 525/351; 521/95; 521/146; 521/89; 525/333.5; 525/334
[58] Field of Search ................................. 525/351, 333.5, 525/344; 521/89, 146

[56] References Cited

U.S. PATENT DOCUMENTS

| | | |
|---|---|---|
| 3,058,944 | 10/1962 | Breslow et al. . |
| 3,203,936 | 8/1965 | Breslow et al. . |
| 3,203,937 | 8/1965 | Breslow et al. . |
| 3,282,864 | 11/1966 | Best et al. . |
| 3,298,975 | 1/1967 | Feild et al. . |
| 3,336,268 | 8/1967 | Cox . |
| 3,341,480 | 9/1967 | Feild et al. . |
| 3,389,198 | 6/1968 | Taber et al. . |
| 3,507,829 | 4/1970 | Bostick et al. . |
| 3,530,108 | 9/1970 | Oppenlander et al. . |
| 3,583,939 | 6/1971 | Bostick et al. ........................... 525/351 |
| 3,770,696 | 11/1973 | Bostick et al. ........................... 525/351 |
| 3,855,184 | 12/1974 | Bostick et al. ........................... 525/351 |
| 4,038,456 | 7/1977 | Marsden et al. . |
| 4,352,892 | 10/1982 | Lohmar . |
| 4,579,905 | 4/1986 | Krabbenhoft ........................... 525/433 |
| 4,694,025 | 9/1987 | Park . |
| 4,714,716 | 12/1987 | Park . |
| 5,037,895 | 8/1991 | Marker et al. . |

FOREIGN PATENT DOCUMENTS

| | | |
|---|---|---|
| 797917 | 6/1968 | Canada . |
| 1024296 | 3/1978 | Canada . |
| 0313912 | 5/1989 | European Pat. Off. . |
| 0 702 032 A2 | 9/1996 | European Pat. Off. . |
| 2276296 | 1/1976 | France . |
| 1570732 | 3/1970 | Germany . |
| 3623759 | 5/1987 | Germany . |
| 46/31756 | 9/1971 | Japan . |
| 1013083 | 12/1965 | United Kingdom . |
| 2 205 103 | 8/1988 | United Kingdom . |
| 96/07681 | 5/1996 | WIPO . |

OTHER PUBLICATIONS

Chemical Abstracts, vol. 118, No. 26, Jun. 28, 1993, p. 17; XP000405852 & JP 04 337306 A (Mitsubishi Petrochemical Co., LTD.) Nov. 25, 1992.

R. A. Abramovitch, "Polar Radicals in Aromatic Substitution", *Intra–Science Chemistry Reports*, pp. 211–218, (1969).

R. A. Abramovitch, G. N. Knaus, M. Pavlin, and W. D. Holcomb, "Reaction of Sulphonyl Azides with Unstrained Olefins", *J. Chem. Soc.* pp. 2169–2172, (1974).

R. A. Abramovitch, T. Chellathurai, W. D. Holcomb, I. T. McMaster, and D. P. Vanderpool, "Intramolecular Insertion of Arylsulfonylnitrenes into Aliphatic Side Chains[1]", *J. Org. Chem.*, vol. 42, No. 17, pp. 2920–2926, (1977).

R. A. Abramovitch, S. B. Hendi, and A. O. Kress, "Pyrolysis of Phenylalkylsulphonyl Azides and 2–phenethyl Azidoformate. Selectivity of Sulphonylnitrenes and Contrast between Sulphonyl–and Carbonyl–nitrenes", *J. Chem. Soc., Chem. Commun.*, pp. 1087–1088, (1981).

(List continued on next page.)

*Primary Examiner*—Morton Foelak

[57] ABSTRACT

The invention includes a process comprising steps of (1) forming a admixture of (a) a vinyl aromatic polymer and (b) a coupling amount of at least one poly(sulfonyl azide); (2) introducing the vinyl aromatic polymer or admixture into a melt processing device; (3) melting the vinyl aromatic polymer or admixture, and thereafter (4) exposing the admixture to a temperature, hereinafter, melt process temperature, sufficient to result in coupling of the vinyl aromatic polymer. The invention also includes a process of increasing the molecular weight of a vinyl aromatic polymer by heating an admixture of at least one vinyl aromatic polymer and a coupling amount of at least one poly(sulfonyl azide). Alternatively the invention is a process comprising steps of (1) forming, under a first pressure, a mixture of a vinyl aromatic polymer, a blowing agent and at least one poly(sulfonyl azide), with the mixture at a temperature at which the viscosity of the mixture is sufficient to retain the blowing agent when the mixture is allowed to expand; (2) extruding the mixture into a holding zone maintained at a temperature and second pressure which does not allow the mixture to foam, the holding zone having an outlet die defining an orifice opening into a zone of a third pressure lower than the first or second pressures at which the mixture foams, and an openable gate closing the die orifice; (3) periodically opening the gate; (4) substantially concurrently applying mechanical pressure by a movable ram on the mixture to eject the mixture from the holding zone through the die orifice into the zone of third pressure, at a rate greater than that at which substantial foaming in the die orifice occurs and less than that at which substantial irregularities in cross-sectional area or shape occurs; and (5) permitting the ejected mixture to expand unrestrained in at least one dimension to produce an elongated thermoplastic cellular body. The invention also includes any composition comprising a product formed by a process of the invention, said composition preferably comprising a foam or polymer and any article formed from such a composition.

9 Claims, No Drawings

OTHER PUBLICATIONS

R. A. Abramovitch, M. Ortiz, and S. P. McManus, "Reaction of Aromatic Sulfonyl Azides with Dienes", *J. Org. Chem.*, vol. 46, pp. 330–335, (1981).

H. Radusch, J. Ding, and M. Schulz, "Chemical coupling of polystyrene and polybutadiene in melt mixtures by using an organic sulfonylazide", *Die Angewandte Makromolekulare Chemie*, vol. 204, pp. 177–189, (1993).

N. Takashima, Y. Nakayama, "The Processings of Crosslinked Plastics", Kogaku Kogyo (Chemical Industry), pp.34(378)–39(383), (1969).

D. S. Breslow, M. F. Sloan, N. R. Newburg, and W. B. Renfrow, "Thermal Reactions of Sulfonyl Azides", *J. Amer. Chem. Soc.*, vol. 91, pp. 2273–2279, (1969).

Derwent Chemical Abstract No. 77–02552Y of JP 51134762 A.

VINYL AROMATIC POLYMER COUPLING AND FOAMS

CROSS REFERENCE STATEMENT

The present application is a divisional of U.S. Ser. No. 09/140,586 filed Aug. 26, 1998 which claims the priority of U.S. provisional application Ser. No. 60/057,677 filed on Aug. 27, 1997.

BACKGROUND OF THE INVENTION

This invention relates to monovinylidene aromatic polymer resins more particularly coupling such resins.

In general, the basic physical properties that are usually desired in the production of molded thermoplastic resin articles are an easily processable starting resin which produces articles that are relatively strong and heat resistant. It is within the skill in the art to produce relatively strong, heat resistant articles from monovinylidene aromatic polymer resins. Most resins used in producing articles possessing these properties must be modified in some way to improve their melt flow characteristics enough to allow them to be both easily and rapidly processed on available processing equipment, such as injection molding equipment, under normal conditions.

To avoid extended residence time requirements and the consequent equipment requirements, it would be desirable to polymerize vinyl aromatic monomers to a lower molecular weight and subsequently build the low molecular weight polymers to higher molecular weight polymers.

It would also be desirable to use lower molecular weight vinyl aromatic polymers for processability and to subsequently build molecular weight to enhance melt strength and extensional properties of a foam stock. Increasing the molecular weight would preferably also increase cell size or density or both. More preferably, by treating the polymer starting materials, one could achieve at least one of greater throughput of polymer into foam (e.g. in kilograms per hour) or lower density than with untreated starting material in the same foaming process while retaining of equivalent or better crush strength or flexibility or both.

In the past, difunctional sulfonyl azides have been used to bridge such polymers as polypropylene, for instance as disclosed by Cox et al. in U.S. Pat. No. 3,336,268, but such reactions lead to crosslinking. Thus, the reactions might be expected to have adverse effects on foams or other properties of vinyl aromatic polymers.

SUMMARY OF THE INVENTION

It has now been found that molecular weight of a vinyl aromatic polymer can be built using reactions with poly(sulfonyl azide). The reaction is also useful to treat polymer feedstock for foams to retain or improve processability and to subsequently build molecular weight to enhance melt strength and extensional properties of a foam stock. Advantageously, the cell size is preferably also increased. More preferably, by treating the polymer starting materials by the process of the invention, one achieves at least one of greater throughput of polymer into foam (e.g. in kilograms per hour) or lower density than with untreated starting material in the same foaming process while retaining of equivalent or better crush strength or flexibility or both.

The invention includes a process comprising steps of (1) forming a admixture of (a) a vinyl aromatic polymer and (b) a coupling amount of at least one poly(sulfonyl azide); (2) introducing the vinyl aromatic polymer or admixture into a melt processing device; (3) melting the vinyl aromatic polymer or admixture, and thereafter (4) exposing the admixture to a temperature, hereinafter, melt process temperature, sufficient to result in coupling of the vinyl aromatic polymer. With the exception of step (4), the steps are optionally in any sequence including overlapping, but preferably in numerical order. Preferably, the coupling amount is from about 0.005 pph to about 2 pph based on the amount of vinyl aromatic polymer; the vinyl aromatic polymer is a polymer of styrene; or the melt process temperature is greater than about 150° C. and below about 250° C.; the melt processing device is an extruder; a uniform admixture of poly(sulfonyl azide) and vinyl aromatic polymer is formed before the admixture is exposed to temperatures sufficient to result in coupling; or a combination thereof.

The poly(sulfonyl azide) preferably has a structure X—R—X wherein each X is $SO_2N_3$ and R represents an unsubstituted or inertly substituted hydrocarbyl, hydrocarbyl ether or silicon-containing group; the poly(sulfonyl azide) has sufficient carbon, oxygen or silicon, atoms to separate the sulfonyl azide groups sufficiently to permit a facile reaction between the vinyl aromatic polymer and the sulfonyl azide; R includes at least one aryl group between the sulfonyl groups; or a combination thereof.

The invention also includes a process of increasing the molecular weight of a vinyl aromatic polymer by heating an admixture of at least one vinyl aromatic polymer and a coupling amount of at least one poly(sulfonyl azide).

In one preferred embodiment, foams are formed. Then, preferably, admixture going into step (4) additionally comprises a blowing agent and the process additionally comprising a steps of extruding the resulting admixture mixture into zone having a pressure lower than the pressure than that in step (4), cooling the admixture and forming a resulting foam. Preferably, the foam has a density of less than about 65 kg/m$^3$ or a cell size of less than about 4 millimeters and greater than about 0.05 millimeters in diameter or a combination thereof. Alternatively the invention is a process comprising steps of (1) forming, under a first pressure, a mixture of a vinyl aromatic polymer, a blowing agent and at least one poly(sulfonyl azide), with the mixture at a temperature at which the viscosity of the mixture is sufficient to retain the blowing agent when the mixture is allowed to expand; (2) extruding the mixture into a holding zone maintained at a temperature and second pressure which does not allow the mixture to foam, the holding zone having an outlet die defining an orifice opening into a zone of a third pressure lower than the first or second pressures at which the mixture foams, and an openable gate closing the die orifice; (3) periodically opening the gate; (4) substantially concurrently applying mechanical pressure by a movable ram on the mixture to eject the mixture from the holding zone through the die orifice into the zone of third pressure, at a rate greater than that at which substantial foaming in the die orifice occurs and less than that at which substantial irregularities in cross-sectional area or shape occurs; and (5) permitting the ejected mixture to expand unrestrained in at least one dimension to produce an elongated thermoplastic cellular body.

The invention also includes any composition comprising a product formed by a process of the invention, said composition preferably comprising a foam or polymer and any article formed from such a composition. The article is preferably in the form of sound or temperature insulation, building or construction foam, fabrication foam, craft foam, buoyancy foam, or packaging.

DETAILED DESCRIPTION OF THE INVENTION

This invention involves coupling of polymers of vinyl aromatic monomers. Vinyl aromatic monomers suitable for preparation of such polymers for use in the present invention include, but are not limited to, those vinyl aromatic monomers known for use in polymerization processes, such as those described in U.S. Pat. Nos. 4,666,987; 4,572,819 and 4,585,825, which are herein incorporated by reference. Preferably, the monomer is of the formula:

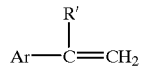

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially para-vinyltoluene, all isomers of ethyl styrene, propyl styrene, vinyl biphenyl, vinyl naphthalene, vinyl anthracene and the like, and mixtures thereof. The vinyl aromatic monomers may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate; maleimide, phenylmaleimide, and maleic anhydride. In addition, the polymerization may be conducted in the presence of pre-dissolved elastomer to prepare impact modified, or grafted rubber containing products, examples of which are described in U.S. Pat. Nos. 3,123,655, 3,346,520, 3,639,522, and 4,409,369, which are incorporated by reference herein.

In the polymerization of the high or intermediate molecular weight polymers, the method for initiation is not critical. For example, the polymerizations are conveniently initiated free radically or anionically. Suitable conditions for thermal free radical initiation as well as suitable free radical and anionic initiator compositions are within the skill in the art. Representative free radical initiators include the peroxide initiators such as the peresters, e.g., tertiary butyl peroxybenzoate and tertiary butyl peroxyacetate, dibenzoyl peroxide, dilauroyl peroxide, 1,1-bis tertiary butyl peroxycyclohexane, 1,1-bis tertiary butyl peroxy-3,3,5-trimethyl cyclohexane and di-cumyl peroxide. Representative anionic initiators include the well known organo lithium initiators, such as n-butyl lithium.

Polymerization processes and process conditions for the polymerization of vinyl aromatic monomers are well known in the art. Although any polymerization process can be used, typical processes are continuous bulk or solution polymerizations as described in U.S. Pat. Nos. 2,727,884 and 3,639,372, which are incorporated herein by reference. The polymerization is typically conducted at temperatures from about 80 to about 200° C., preferably from about 90 to about 190° C., more preferably from about 100 to about 185° C., and most preferably from about 110 to about 180° C.

The present invention is also applicable to the rigid, matrix or continuous phase polymer of rubber-modified monovinylidene aromatic polymer compositions.

The term "polymer" is used herein to refer to polymers of at least one vinyl aromatic monomer, also referred to herein as vinyl aromatic polymers, or monovinylidene aromatic polymer compositions.

Monovinylidene aromatic polymers are those comprising at least a major portion of an addition polymerized monomer of the formula:

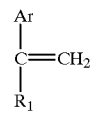

wherein $R_1$ is selected from the group of radicals consisting of hydrogen and alkyl radicals containing three carbons or less and Ar is selected from the group of radicals consisting of phenyl, halophenyl, alkylphenyl and alkylhalophenyl. Preferably, $R_1$ is a hydrogen or methyl radical. Preferably, Ar is phenyl or alkylphenyl. Preferably, the polymer is polystyrene.

Compositions of the invention and articles including foams of the invention comprise a polymer material. The polymer material comprises in whole or in part a linear, monovinyl aromatic polymer coupled according to practice of the invention. The monovinyl aromatic polymer is optionally a homopolymer or a copolymer formed from monovinyl aromatic monomers and copolymerizable ethylenically unsaturated comonomers. Minor amounts of monoethylenically unsaturated comonomers such as C2–6 alkyl acids and esters, ionomeric derivatives, and C4–6 dienes are optionally copolymerized with monovinyl aromatic monomers. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Comonomer content is less than 50 percent and preferably less than 30 percent based upon the weight of the alkenyl aromatic polymer. Regardless of composition, the polymer material comprises greater than 50 and preferably greater than 70 weight percent monovinyl aromatic monomeric units. Most preferably, the monovinyl aromatic polymer material is comprised substantially or entirely of monovinyl aromatic monomeric units.

Polystyrene is the most common family of the monovinylidene aromatic polymers and is therefore a preferred embodiment within polystyrenes. Widely recognized categories of polymers include but are not limited to (1) general purpose polystyrene (GPPS) which is a homopolymer of styrene which optionally contains additives such as plasticizers and/or mold release agents (e.g. zinc stearate) and (2) high impact polystyrene (HIPS) which contains a rubber as well as optional additives like a plasticizer or mold release agent. The rubbers are most advantageously diene rubbers, preferably polybutadiene or polybutadiene block polystyrene rubbers and are preferably present in amounts of from about 2 to about 12 percent by weight.

As use herein, the Mw of a polymer means the weight average molecular weight of the polymer while Mn means the number average molecular weight. In addition, in the present compositions, the increased high molecular weight polymer is reflected in the Mz value of the resin, the "z-average" molecular weight. The Mz of a resin is believed to more accurately show the effect of high molecular weight constituents of a resin. For the purpose of defining the present invention, the molecular weight data for components having weight average molecular weights up to about 700,000 is determined by gel permeation chromatography (GPC). The GPC analysis is conveniently with a GPC column which is linear from Mw's of about 600 to about 2,000,000. In the case of the very high average molecular weight polymers (above 700,000 and higher), the molecular weight is accurately determined from the solution viscosity of a 10 percent solution of the polymer in toluene.

The ratio of the weight average and number average molecular weights, Mw/Mn, often called the dispersion index, is an indication of the broadness or narrowness of the distribution of molecular weights; the larger the number given by this ratio, the broader the molecular weight distribution. The molecular weight distribution can also be shown graphically by plotting the log of the molecular weight of very shall polymer fractions on the X-axis, against the percentage of the total composition weight that such molecular weight polymer makes up, on the Y-axis, Determining this data using GPC is within the skill in the art and such plots are called GPC curves. In general, the GPC curves for isothermal styrenic polymers are single-peaked, bell-shaped curves, the relatively broader or narrower shape of the "bell" indicating broad or narrow distribution as used herein, generally refers to the shape of the curves obtained by GPC analysis of such polymers which is reflected in the Mw/Mn ratios. Preferably the molecular weight distribution is less than about 20, more preferably less than about 10, most preferably less than about 5. The molecular weight distribution is preferably at least about 2, more preferably greater than about 2.

Preferred polymers for use as starting materials in the practice of the invention include polymers having a molecular weight Mw of at least about 50,000 to more preferably at least about 80,000, most preferably at least about 100,000, but preferably at most about 400,000, more preferably at most about 350,000, most preferably at most about 300,000.

Conveniently, the vinyl aromatic polymer has a melt flow index as determined by the procedures of ASTM 1238, at 200° C. using a 5 kg weight of less than about 200 g/10 minutes, more preferably less than about 60 g/10 min.

For the purposes of coupling, the polymer is reacted with a poly(sulfonyl azide) compound capable of insertion reactions into C—H bonds.

Poly(sulfonyl azide) compounds having at least two sulfonyl azide groups capable of C—H insertion under reaction conditions are referred to herein as coupling agents.

The poly(sulfonyl azide) is any compound having at least two sulfonyl azide groups ($-SO_2N_3$) reactive with the polymer. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polymer and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting coupled polymers. Such groups include fluorine, aliphatic or aromatic ether, siloxane as well as sulfonyl azide groups when more than two polymer chains are to be joined. Suitable structures include R as aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis (sulfonyl azides). Poly(sulfonyl)azides include such compounds as 1, 5-pentane bis(sulfonlazide), 1,8-octane bis (sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

To couple, the poly(sulfonyl azide) is used in a coupling amount, that is an amount effective to increase the molecular weight of the polymer preferably at least about 2 percent as compared with the starting material polymer, but less than a crosslinking amount, that is an amount sufficient to result in at least about 400 percent increase in molecular weight. The amount is preferably less than about 2 parts per hundred by weight (pph), more preferably less than about 1 pph, most preferably less than about 0.5 pph poly(sulfonyl azide) based on total weight of polymer when the poly(sulfonyl azide) has a molecular weight of from about 200 to about 2000. To achieve measurable rheology modification, the amount of poly(sulfonyl azide) is preferably at least about 0.005 pph, more preferably at least about 0.01 pph, most preferably at least about 0.02 pph based on total polymer.

For coupling, the sulfonyl azide is admixed with the polymer and heated to at least the decomposition temperature of the sulfonyl azide. By decomposition temperature of the azide it is meant that temperature at which the azide converts to the sulfonyl nitrene, eliminating nitrogen and heat in the process, as determined by differential scanning calorimetry (DSC). The poly(sulfonyl azide)begins to react at a kinetically significant rate (convenient for use in the practice of the invention) at temperatures of about 130° C. and is almost completely reacted at about 160° C. in a DSC (scanning at 10° C./min). Accelerating rate calorimetry (ARC) (scanning at 2° C./ hr) shows onset of decomposition is about 100° C. Extent of reaction is a function of time and temperature. At the low levels of azide used in the practice of the invention, the optimal properties are not reached until the azide is essentially fully reacted. Temperatures for use in the practice of the invention are also determined by the softening or melt temperatures of the polymer starting materials. For these reasons, the mixing temperature is advantageously greater than about 50° C., preferably greater than about 80° C., more preferably greater than about 90° C. The coupling reaction temperature is preferably greater than about 90° C., more preferably greater than about 130° C., most preferably greater than about 150° C. Similarly, the coupling temperature is preferably less than about 300° C., more preferably less than about 260° C. most preferably less than about 250° C.

Preferred times at the desired decomposition temperatures are times that are sufficient to result in reaction of the coupling agent with the polymer(s) without undesirable thermal degradation of the polymer matrix. Preferred reaction times in terms of the half life of the coupling agent, that is the time required for about half of the agent to be reacted at a preselected temperature, which half life is determinable by DSC is about 5 half lives of the coupling agent. In the case of a bis(sulfonyl azide), for instance, the reaction time is preferably at least about 4 minutes at 200° C. Conveniently the polymer and poly(sulfonyl azide) are processed for at least about 5, more preferably at least about 15, most preferably at least about 30 seconds, but preferably less than about 2 hour, more preferably less than about 30 minutes most preferably less than about 15 minutes.

Preferred processes include at least one of (a) dry blending the coupling agent with the polymer, preferably to form a substantially uniform admixture and adding this mixture to melt processing equipment, e.g. a melt extruder to achieve the coupling reaction, at a temperature at least the decomposition temperature of the coupling agent; (b) introducing, e.g. by injection, a coupling agent in liquid form, e.g. dissolved in a solvent therefor or in a slurry of coupling agent in a liquid, into a device containing polymer, preferably softened, molten or melted polymer, but alternatively in particulate form, in solution or dispersion, more preferably in melt processing equipment; (c) forming a first admixture of a first amount of a first polymer and a coupling agent, advantageously at a temperature less than about the decomposition temperature of the coupling agent, preferably by melt blending, and then forming a second admixture of the first admixture with a second amount of a second polymer (for example a concentrate of a coupling agent admixed with at least one polymer and optionally other additives, is conveniently admixed into a second polymer or combination thereof optionally with other additives, to modify the second polymer(s)); (d) feeding at least one coupling agent, preferably in solid form, more preferably finely comminuted, e.g. powder, directly into softened or molten polymer, e.g. in melt processing equipment, e.g. in an extruder; or combinations thereof. Among processes (a) through (d), processes (b) and (c) are preferred, with (c) most preferred. For example, process (c) is conveniently used to make a concentrate with a first polymer composition having a lower melting temperature, advantageously at a temperature below the decomposition temperature of the coupling agent, and the concentrate is melt blended into a second polymer composition having a higher melting temperature to complete the coupling reaction. Concentrates are especially preferred when temperatures are sufficiently high to result in loss of coupling agent by evaporation or decomposition not leading to reaction with the polymer, or other conditions would result that effect. Alternatively, some coupling occurs during the blending of the first polymer and coupling agent, but some of the coupling agent remains unreacted until the concentrate is blended into the second polymer composition. Each polymer or polymer composition includes at least one homopolymer, copolymer, terpolymer, or interpolymer and optionally includes additives within the skill in the art. When the coupling agent is added in a dry form it is preferred to mix the agent and polymer in a softened or molten state below the decomposition temperature of the coupling agent then to heat the resulting admixture to a temperature at least equal to the decomposition temperature of the coupling agent.

The term "melt processing" is used to mean any process in which the polymer is softened or melted, such as extrusion, pelletizing, molding, thermoforming, film blowing, compounding in polymer melt form, fiber spinning, and the like.

Admixing of the polymer and coupling agent is conveniently accomplished by any means within the skill in the art. The polymers and coupling agent are suitably combined in any manner which results in desired reaction thereof, preferably by mixing the coupling agent with the polymer(s) under conditions which allow sufficient mixing before reaction to avoid uneven amounts of localized reaction then subjecting the resulting admixture to heat sufficient for reaction. Preferably, a substantially uniform admixture of coupling agent and polymer is formed before exposure to conditions in which chain coupling takes place. A substantially uniform admixture is one in which the distribution of coupling agent in the polymer is sufficiently homogeneous to be evidenced by a polymer having a consistent molecular weight in samples taken periodically or in various samples throughout a production run or series of experiments using the same starting materials, reactants conditions and amounts after treatment according to the practice of the invention. If mixing is insufficient, variations are noted because of high molecular weights where coupling agent is concentrated and low molecular weights were there is little or no coupling agent. A beneficial effect has occurred when, after treatment according to the practice of the invention Mw and Mz are higher than that of the same polymer which has not been treated with the coupling agent but has been subjected to the same shear and thermal history. Thus, preferably, in the practice of the invention, decomposition of the coupling agent occurs after mixing sufficient to result in a substantially uniform admixture of coupling agent and polymer. This mixing is preferably attained with the polymer in a molten or melted state, that is above the glass transition temperature, or in a dissolved or finely dispersed condition rather than in a solid mass or particulate form. The molten or melted form is more preferred to insure homogeneity rather than localized concentrations at the surface.

Any equipment is suitably used, preferably equipment which provides sufficient mixing and temperature control in the same equipment, but advantageously practice of the invention takes place in such devices as an extruder or a static polymer mixing devise such as a Brabender blender. The term extruder is used for its broadest meaning to include such devices as a device which extrudes pellets or pelletizer. Conveniently, when there is a melt extrusion step between production of the polymer and its use, at least one step of the process of the invention takes place in the melt extrusion step. While it is within the scope of the invention that the reaction take place in a solvent or other medium, it is preferred that the reaction be in a bulk phase to avoid later steps for removal of the solvent or other medium. For this purpose, a polymer above the crystalline melt temperature is advantageous for even mixing and for reaching a reaction temperature (the decomposition temperature of the sulfonyl azide).

In a preferred embodiment the process present invention takes place in a single vessel, that is mixing of the coupling agent and polymer takes place in the same vessel as heating to the decomposition temperature of the coupling agent. The vessel is preferably a twin-screw extruder, but is also advantageously a single-screw extruder or a batch mixer. The reaction vessel more preferably has at least two zones of different temperatures into which a reaction mixture would pass, the first zone advantageously being at a temperature at least the crystalline melt temperature or the softening temperature of the polymer(s) and preferably less than the decomposition temperature of the coupling agents and the second zone being at a temperature sufficient for decomposition of the coupling agent. The first zone is preferably at a temperature sufficiently high to soften the polymer and allow it to combine with the coupling agent through distributive mixing to a substantially uniform admixture.

For polymers that have softening points above the coupling agent decomposition temperature (preferably greater than 200° C.), and especially when incorporation of a lower melting polymer (such as in a concentrate) is undesirable, the preferred embodiment for incorporation of coupling agent is to solution blend the coupling agent in solution or admixture into the polymer, to allow the polymer to imbibe (absorb or adsorb at least some of the coupling agent), and then to evaporate the solvent. After evaporation, the resulting mixture is extruded. The solvent is preferably a solvent for the coupling agent, and more preferably also for the polymer. Such solvents include polar solvents such as acetone, THF (tetrahydrofuran), methyl isobutyl ketone and chlorinated hydrocarbons such as methylene chloride. Alternatively other non-polar compounds such as mineral oils in which the coupling agent is sufficiently miscible to disperse the coupling agent in a polymer, are used.

Practice of the process of the invention to couple polymers yields chain coupled polymers, that is the polymers which have sulfonamide, coupling between different polymer chains. Resulting polymers advantageously show higher molecular weight viscosity than the original polymer due to coupling of long polymer chains to polymer backbones.

Polymers coupled according to the practice of the invention have weight average molecular weights (Mw) increased from that of the starting material by at least about 2 percent, preferably at least about 5 percent, more preferably at least about 10 percent or Mz increased by at least about 4 percent, preferably at least about 10 percent, most preferably at least about 20 percent. Conveniently coupled polymers have Mw less than about 300 percent greater, preferably less than about 150 percent, more preferably less than about 100 percent greater than that of the starting polymer, or Mz correspondingly increased less than about 600 percent, more preferably less than about 300 percent, most preferably less than about 200 percent. Preferred coupled polymers thus have molecular weights at least about 60,000, more preferably at least about 80,000 most preferably at least about 100,000. Conveniently these preferred coupled polymers have Mw less than about 500,000 more preferably less than about 425,000, most preferably less than about 375,000.

Those skilled in the art are aware that particular molecular weight ranges of aromatic polymer are useful for certain applications. See, for instance, Encyclopedia of Polymer Science and Engineering, Vol. 16, pp 197 and 203, Second ed. 1989, John Wiley and Sons, Inc. For example foam sheet is made from GPPS with a Mw of up to about 320,000 while foam beads are made from GPPS with a Mw up to about 250,000. However, it is often inefficient to produce a variety of molecular weights in a production plant because of the time and product intermix required to convert from one molecular weight product to another. Practice of the present invention affords the opportunity to produce fewer polymers of different molecular weights in a production polymerization process than are desired and to produce from those polymers, other polymers having a variety of molecular weights. For instance a polymerization plant can produce one product having a first molecular weight and coupling according to practice of the invention is useful to produce from that first polymer, a variety of polymer products having different molecular weights greater than that of the first polymer. To achieve a variety of molecular weight products, the coupling agent is used at a variety of levels in the practice of the invention. Similarly, a customer can buy polymer of one molecular weight and practice the present invention to prepare polymers of several molecular weights suitable for his applications for the polymers. Both of these applications of the practice of the invention allow minimum inventory because it is unnecessary to prepare or buy and store a variety of molecular weights of the polymer. Analogously, practice of the invention facilitates building molecular weight beyond that normally achieved in a polymerization process where molecular weight is limited by practical or economic kinetics of free radical polymerization (The reaction rate would be undesirably slow to obtain high molecular weights. For instance under one set of conditions, raising molecular weight from about 280,000 to about 320,000 would result in production time increase of about 30 percent.)

Another preferred embodiment of the invention is practice of the invention to form foams. Those skilled in the art recognize that foam properties and/or production are improved by use of such enhancements as broad molecular weight polymers for instance as disclosed by Paquet et al. in U.S. Pat. No. 5,650,106 or by use of branched polystyrene as disclosed in WO 96/11970. Similar and advantageously superior results are obtained by coupling before or during a foam forming process.

In the practice of this invention, foams are optionally prepared by a means within the skill in the art advantageously characterized by admixing, preferably before introduction into or within an extruder or other vessel, a polymer, preferably a polymer of at least one vinyl aromatic monomer and (b) at least about 0.005 to about 2 pph of a poly (sulfonyl azide) based on the weight of the polymer, and optionally additionally including a nucleating agent. A foaming agent is admixed with the polymer and the resulting admixture is advantageously extruded such that the pressure outside the vessel containing the admixture is less than that on the admixture in the vessel.

Practice of the foam making process of the invention results in foams which have properties of an increased ratio of melt strength to viscosity as demonstrated by the ratio of Mz to Mw increasing with increasing loadings of the poly (sulfonyl azide) as compared with those prepared from the same starting material vinyl aromatic foams which are not coupled according to the practice of the invention. The foams are useful in sound and temperature insulation, building and construction foam, fabrication foam, craft foams, buoyancy foam, or packaging.

Within the skill in the art, plasticizing polymers are optionally incorporated into the vinyl aromatic polymer material to further enhance polymer melt processability. Useful Plasticizing polymers include low molecular weight polymers of alpha methyl styrene or limonene, with d-limonene being the preferred limonene. The plasticizing polymer is optionally a copolymer or a homopolymer. Useful plasticizing polymers are within the skill in the art as disclosed in U.S. Pat. No. 5,422,378. However, such plasticizing polymers are advantageously used in less quantity or not needed to achieve the same or similar plasticizing effect with practice of the present invention.

A foam is conveniently prepared by heating a polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent is optionally incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator is blended in the polymer melt or dry blended with the polymer material prior to plasticizing or melting. The foamable gel is typically cooled to a lower temperature to optimize physical characteristics of the foam structure. The gel is optionally cooled in the extruder or other mixing device or in separate coolers, preferably to a temperature above, more preferably at least about 5° C. above, most preferably up to about 40° C. above, the softening point or glass transition temperature of the vinyl aromatic polymer. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure is optionally superatmospheric or subatmospheric (evacuated or vacuum), but is preferably at an atmospheric level.

In the practice of the invention the polymer is coupled using a poly(sulfonyl azide), before, during or after admixture with the blowing agent. Conveniently the coupling agent is admixed with the polymer preferably before or optionally during admixture with the blowing agent and the admixture is heated at least to the decomposition temperature of the poly(sulfonyl azide) for a period sufficient to result in coupling before the foam is formed.

Blowing agents (also referred to herein as foaming agents) useful in making the present foam include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1 -trifluoroethane (HFC-143a), 1,1,1,2-tetrafluoroethane (HFC-134a), 1,1,2,2-tetrafluoromethane (HFC-134), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N, N'-dinitrosoterephthalamide, and trihydrazino triazine.

Though the present process optionally employs any known blowing agent, the process is particularly useful with blowing agents exhibiting high vapor pressure and low solubility in monovinyl aromatic polymer melts. Such blowing agents include carbon dioxide and 1,1,1,2-tetrafluoroethane (HFC-134a). Preferred blowing agents include carbon dioxide, water, aliphatic alcohols having 1–3 carbon atoms, aliphatic hydrocarbons having 1–9 carbon atoms, 1,1- difluoroethane (HFC-152a), 1,1,1,2- tetra fluoroethane (HFC-134a), 1,1,2,2 -tetrafluoroethane (HFC-134), other fully and partially halogenated aliphatic hydrocarbons, and combinations thereof. A particularly useful blowing agent system is one comprised entirely of carbon dioxide.

The amount of blowing agent incorporated into the polymer melt material to make a foam-forming polymer gel is from about 0.2 to about 5.0 gram-moles per kilogram of polymer, preferably from about 0.5 to about 3.0 gram-moles per kilogram of polymer, and most preferably from about 1.0 to 2.50 gram-moles per kilogram of polymer.

A nucleating agent is optionally added to control the size of foam cells. Preferred nucleating agents include inorganic substances such as calcium carbonate, talc, clay, titanium dioxide, silica, barium stearate, calcium stearate, diatomaceous earth, mixtures of citric acid and sodium bicarbonate, and the like. The amount of nucleating agent employed advantageously ranges from about 0.01 to about 5 parts by weight per hundred parts by weight of a polymer resin. The preferred range is from 0.1 to about 3 parts by weight.

The present foam preferably has a density of from about 16 to about 250 kilograms per cubic meter measured according to ASTM D-1622-88, more preferably a density less than about 65 Kg/m. Preferably the foam has a density less than that of a foam made from the starting material polymer foamed by the same procedure but without treatment by practice of the invention. The foam preferably has an average cell size of about 3 mm or less measured according to ASTM D3576-77. The foam preferably retains physical properties such as crush strength as measured by (ASTM D__-1621-79) or flexibility as measured by (ASTM__C203) or a combination thereof as compared with that of a polymer of the same starting materials not treated according to the practice of the invention. More preferably, by treating the polymer starting materials by the process of the invention, one can achieve at least one of greater throughput of polymer into foam (e.g. in kilograms per hour) or lower density than with untreated starting material in the same foaming process while retaining of equivalent or better crush strength or flexibility or both.

The foam optionally takes any physical configuration known in the art such as sheet or plank. The foam is particularly suited to be formed by extrusion into a plank, desirably one having a cross-sectional area of 30 square centimeters (cm) or more and a minor dimension in cross-section (thickness) preferably of ⅜ inch (0.95 centimeter) or more. The foam is also conveniently extruded in the form of a sheet of less than ⅜ inch (0.95 centimeter) cross-section thickness and a cross-sectional area of 10 $cm^2$ or more.

The foam is optionally closed cell or open cell. Preferred closed-cell foams have greater than 90 percent closed cell content measured according to ASTM D2856-87.

Various additives are optionally incorporated in the foam structure such as inorganic fillers, pigments, antioxidants, acid scavengers, ultraviolet absorbers, flame retardants, processing aids, extrusion aids, and the like.

The foam is optionally used to insulate a surface by applying to the surface an insulating panel fashioned from the foam. Such panels are useful in any conventional insulating applications such as roofing, buildings, refrigerators, etc.

The following examples are to illustrate this invention and not limit it. Ratios, parts, and percentages are by weight unless otherwise stated. Examples (Ex) of the invention are designated numerically while comparative samples (C.S.) are designated alphabetically and are not examples of the invention.

EXAMPLES 1–8 AND COMPARATIVE SAMPLES A–C

The general purpose and high impact polystyrenes indicated in Table 1 were dry tumble blended with the indicated loadings of 4,4'-oxybis(benzene sulfonyl azide), hereinafter "poly(sulfonyl azide)," using 1400 PPM mineral oil as a tackifying agent. The blends were compounded on a 30 mm intermeshing co-rotating twin screw extruder at a lower temperature in the extruder and with a melt temperature of 240° C. near the terminus thereof. The same polystyrene was compounded without the azide under the same conditions for comparison. During the extrusion process, observation of the polymer extrudate showed that the melt strength had increased and a viscosity increase was indicated by an increase of extruder pressure. The molecular weights (Mw and Mz, as determined by gel permeation chromatography) increased by as much as 48 percent and 88 percent, respectively. These data indicate that coupling has been introduced in the various polymers.

TABLE 1

|  | 0 ppm | 250 ppm | loading of azide 500 ppm | 750 ppm | 1000 ppm |
|---|---|---|---|---|---|
| Styron* 666D polystyrene | C.S. A | Ex. 1 | Ex. 2 |  | Ex. 3 |
| Mn | 68500 | 73300 | 74000 |  | 64900 |
| Mw | 230100 | 244600 | 268700 |  | 311300 |
| Mz | 413100 | 472400 | 531700 |  | 682100 |
| Mw/Mn | 3.35 | 3.34 | 3.63 |  | 4.80 |
| % increase in Mw |  |  |  |  | 35 |
| % increase in Mz |  |  |  |  | 65 |
| Extruder pressure (psi) | 33 |  |  |  | 93 |
| Styron** 685D polystyrene | C.S. B | Ex. 4 | Ex. 5 | Ex. 6 |  |
| Mn | 118000 | 115300 | 119600 | 113700 |  |
| Mw | 280800 | 325500 | 356700 | 404200 |  |
| Mz | 476100 | 585800 | 676600 | 893000 |  |
| Mw/Mn | 2.38 | 2.82 | 2.98 | 3.55 |  |
| % increase in Mw |  |  |  | 44 |  |
| % increase in Mz |  |  |  | 88 |  |
| Extruder pressure (psi) | 64 | 77 | 99 | 126 |  |
| Styron*** 484 polystyrene | C.S. C | Ex. 7 | Ex. 8 |  |  |
| Mn | 91200 |  | 95400 |  | 100500 |
| Mw | 219300 |  | 253200 |  | 323700 |
| Mz | 368900 |  | 461900 |  | 686600 |
| Mw/Mn | 2.40 |  | 2.65 |  | 3.22 |
| % increase in Mw |  |  |  |  | 48 |
| % increase in Mz |  |  |  |  | 86 |
| Extruder pressure (psi) | 36 |  | 41 |  | 77 |

*A general purpose polystyrene containing plasticizer commercially available from The Dow Chemical Company under the trade designation Styron 666D general purpose polystyrene which is commonly used for injection molding and has properties of melt flow rate according to ASTM 1238 (MFR) 8 g/10 min at 200° C. using a 5 kg weight.
**A general purpose polystyrene not containing plasticizer commercially available from The Dow Chemical Company under the trade designation Styron 685D general purpose polystyrene which is commonly used for making polystyrene foam sheet and oriented polystyrene sheet and has properties of MFR 1.5.
***A high impact polystyrene containing plasticizer commercially available from The Dow Chemical Company under the trade designation Styron 484 polystyrene which is commonly used for extrusion applications and has properties of Vicat heat distortion temperature of 101° C., MFR 2.8.

EXAMPLES 9–12 AND COMPARATIVE SAMPLES D AND E

Example of the Molecular Weight and Viscosity Changes Resulting from Practice of the Invention Examples 9–12 and Comparative Samples D and E represent the application of the invention to modifying the properties of a polystyrene foam feedstock, a polystyrene with a starting molecular weight of nominally 135,000. The starting material is prepared using three 22 liter plug flow reactors in series for the following polymerization: The reactors are equipped with agitators to insure mixing and good heat transfer, as well as heating and cooling jackets to maintain the polymerizing mass at the given temperatures. The temperature profiles of the three reactors are as follows:

| Incoming feed temp | 100° C. |
|---|---|
| Reactor 1 | |
| Zone 1 | 115° C. |
| Zone 2 | 115° C. |
| Zone 3 | 115° C. |
| Reactor 2 | |
| Zone 1 | 130° C. |
| Zone 2 | 145° C. |
| Zone 3 | 155° C. |
| Reactor 3 | |
| Zone 1 | 164° C. |
| Zone 2 | 175° C. |
| Zone 3 | 175° C. |

The first feed of 97 weight percent styrene, 3 weight percent ethylbenzene and 25 ppm initiator commercially available from Akzo Nobel under the trade designation Triganox™ is continuously fed into zone 1 of the first reactor at a rate of 8.6 kg/h. The polymerization continues through zones 2 and 3. The mixture from zone 3 of the first reactor is continuously fed into zone 1 of the second reactor along with a second feed. The second feed consists of 98.8 weight percent ethylbenzene and 1.2 weight percent n-dodecyl mercaptan, and is continuously fed at a rate of 1.2 kg/h. The polymerization is completed through the subsequent zones of the second and third reactors, followed by devolatilization in a vacuum devolatilizer operating at 20 mm Hg (2.7 kPa) absolute pressure and 225° C. Yield from the devolatilizer is 4.25 kg/h.

In Examples 9–12 the amounts of poly(sulfonyl azide) designated in the Table 1 is reacted with the foam feedstock according to the procedure of Example 1 except that the extruder size was 40 mm. Foam was not made with these examples. The data is in Table 2-A. Comparative Sample D is the feedstock before it has been processed in a twin-screw extruder, and Comparative Sample E is the result of processing the feedstock and shows typical degradation of Mw (and other molecular weight properties) due to the thermal conditions of processing in the twin screw extruder. However, rheological measurements (shear and extensional viscosities) were measured for the Comparative Sample E and Examples 11 and 12. These data are summarized in Table 2-B. In the tables "Azide" refers to 4,4'-oxybis (benzene sulfonyl azide).

TABLE 2-A

Effect of Azide on Foam Feed Stock Molecular Weight

|  | C.S. D | C.S. E | Ex. 9 | Ex. 10 | Ex. 11 | Ex. 12 |
| --- | --- | --- | --- | --- | --- | --- |
| PPM Azide | 0 | 0 | 200 | 400 | 1,000 | 2,000 |
| Mn | 60,000 | 53,100 | 56,500 | 57,300 | 59,800 | 61,500 |
| Mw | 138,300 | 126,700 | 134,400 | 138,100 | 155,100 | 178,800 |
| Mz | 233,300 | 205,200 | 230,400 | 242,000 | 307,700 | 379,100 |
| MWD | 2.304 | 2.386 | 2.377 | 2.410 | 2.591 | 2.909 |

Comparison of the viscosity of 135,000 molecular weight polystyrene without coupling according to the practice of the invention and with 1000 and 2000 ppm 4,4'-oxybis(benzene sulfonyl azide)over a range of frequencies from about 1E-02.5 to about 1E+03 rad/sec as obtained using a capillary rheometer commercially available from Rheotens Corp. according to the manufacturer's directions or according to the procedures of ASTM D 3835-96 at a temperature of 180° C. shows that the low frequency viscosity of the coupled material is greater than that of the starting material but that the viscosities converge and become almost the same by 1E+02 rad/sec.

A convenient means for comparing viscosity of different samples is by way of ratio. In Table 2B the base sample is the untreated 135,000 molecular weight polystyrene (Comparative Sample D). Ratios are provided at various shear rates. Ratios with values greater than 1 indicate the treated material has a greater viscosity than the untreated polystyrene and ratios with values less than 1 indicate the opposite effect.

TABLE 2-B

EFFECT OF AZIDE ON VISCOSITY OF 135,000 Molecular Weight Polystyrene USED AS FOAM FEEDSTOCK

| Description of sample | Shear Rate, rad/sec | Extensional Viscosity Ratio | Shear Viscosity Ratio |
| --- | --- | --- | --- |
| Base PS treated with 1000 ppm of azide | 0.01 | 2.35 (estimated) | 1.63 |
| Base PS treated with 1000 ppm of azide | 0.1 | 2.11 | 1.47 |
| Base PS treated with 1000 ppm of azide | 1 | 2.13 | 1.23 |
| Base PS treated with 1000 ppm of azide | 10 | 2.00 | 1.06 |
| Base PS treated with 1000 ppm of azide | 100 | na | 1.00 |
| Base PS treated with 2000 ppm of azide | 0.01 | 7.05 (estimated) | 3.50 |
| Base PS treated with 2000 ppm of azide | 0.1 | 4.76 | 2.53 |

TABLE 2-B-continued

EFFECT OF AZIDE ON VISCOSITY OF 135,000 Molecular Weight Polystyrene USED AS FOAM FEEDSTOCK

| Description of sample | Shear Rate, rad/sec | Extensional Viscosity Ratio | Shear Viscosity Ratio |
| --- | --- | --- | --- |
| Base PS treated with 2000 ppm of azide | 1 | 5.6 | 1.62 |
| Base PS treated with 2000 ppm of azide | 10 | 4.77 | 1.18 |
| Base PS treated with 2000 ppm of azide | 100 | na | 1.00 |

These data show, for example that 1000 ppm of azide reacted with 135,000 molecular weight polystyrene will increase the shear viscosity 63 percent when compared at a shear rate of 0.01 rad/sec and 180° C., and 2000 ppm azide will increase the shear viscosity by 250 percent when compared at 0.01 rad/sec and 180° C. Furthermore, the shear viscosity ratio approaches 1 as the shear rate increases to 100 rad/sec. The reaction of the poly(sulfonyl azide) with the 135,000 molecular weight polystyrene shows the extensional viscosity increases substantially for both levels of azide. The greater extensional viscosity imparts more strength to the polymer as it is expanding into a foam.

EXAMPLES 13–15 and COMPARATIVE SAMPLES F and G

Foams

The polymer used is the general purpose polystyrene used as a starting material in Examples 9–12 and Comparative Samples D and E which has properties of melt flow rate (MFR) according to ASTM 1238 of about 25 g/ 10 min at 200° C. and using a 5 kg weight.

The polymer was fed to a pilot-scale foam extrusion line at a rate of 5 pounds/hour (2.3 kg/h) for a period of at least 4 hours or until thoroughly representative of the polymer in the foam line. The pilot-scale foam line consists of a 1-inch (25 mm) single-screw extruder that melts and mixes the solid additives and the polymer into a melt, and pumps the melt through the process. The melt is then mixed with the blowing agent, carbon dioxide in this case. The resulting gel (polymer, additives, and blowing agent) is then cooled using, for example static mixer coolers manufactured by Koch or rotary coolers for dynamic cooling. This cooling step brings the gel to a uniform temperature (foaming temperature) before it is delivered to the shaping die. The shaping die maintains the proper pressure control for expansion into a foam and shaping to a desired cross section (thickness and width). The system volume of the pilot-scale foam line from feed to the extruder to the discharge of the shaping die requires 15 minutes at 5 pounds/hour (2.3 kg/h) feed rate. Typically, 3–4 system volumes (residence volumes) are needed to observe the effects of the process conditions to make foam in a stable mode. Carbon dioxide blowing agent was added at a rate of 4 parts per hundred parts of polystyrene (0.2 lbs./h) (0.1 kg/h) using a positive displacement pump with sufficient head pressure to maintain the carbon dioxide in a compress liquid state. No other additives from a typical foam formulation were used. For Comparative Samples F and G, control formulations without the sulfonyl azide were made at 130° C. and 140° C. foaming temperatures, respectively. The die pressure was determined by pressure transducers at the entry to the shaping die and die pressure was regulated by adjusting the opening of the die via mechanical means.

For Examples 13–15, the polystyrene in 15 kg lots was tackified with 1000 ppm of mineral oil by agitating the two materials thoroughly in a plastic bag. Careful addition of the mineral oil under continual agitation was used to assure uniform coating of the polystyrene by the mineral oil. Then, the tackified polystyrene was blended with 1000 ppm of the poly(sulfonyl azide) using the same mixing scheme to assure uniform coating of the tackified polystyrene by the azide. This prepared the material as feed to the extruder. The sulfonyl azide was fed at 1000 ppm (0.005 lb/h) (0.0023 kg/h) carried in on the coated polystyrene at each of the foaming temperatures of the control formulation and with equivalent die pressures. Die gap readings were made by using a micrometer (linear gauge) attached to the mechanical adjustment of the die. The gauge was calibrated at the fully closed position before starting the experiments. Foam samples were obtained for each condition. The foam property measurements for density (ASTM D 1622), thickness, and cell size (ASTM D 3576) as well as changes in molecular weight (by gel permeation chromatography) were measured to determine the influence of the azide reaction on the polystyrene. These results are summarized in Table 3.

lar weight properties are still changing after 4 residence volumes of the foam extrusion system. This is not due to greater reaction time, but rather the time required to purge the foam line of unmodified polystyrene and the foam extrudate being representative of polystyrene modified with 1000 ppm of sulfonyl azide, as described previously.

What is claimed is:

1. A process comprising the steps of (1) forming a admixture of (a) a polymer consisting essentially of a vinyl aromatic polymer and (b) a coupling amount of at least one poly(sulfonyl azide), wherein the coupling amount is less than 0.20 weight percent based on the total weight of the vinyl aromatic polymer; (2) introducing the vinyl aromatic polymer or admixture into a melt processing device; (3) melting the vinyl aromatic polymer or admixture, and thereafter (4) exposing the admixture to a temperature, hereinafter, melt process temperature, sufficient to result in coupling of the vinyl aromatic polymer.

2. The process of claim 1 wherein the vinyl aromatic polymer is a polymer of styrene; and the melt process temperature is greater than about 150° C. and below about 250° C.

TABLE 3

Summary of Experimental Foaming Results

| Example or Comparative Sample | Die Pressure, psig (kPa) | Die Gap, inches (m) | Foaming Temperature, ° C. | Sulfonyl Azide Level, ppm | Foam Density, lb/cu ft (kg/m³) | Cell Size, mm | Thickness, inches (m) | Mw | Mn | Mz | Mw/Mn | Comments* |
|---|---|---|---|---|---|---|---|---|---|---|---|---|
| Ex. 13 | 1340 (9239) | 0.015 (0.00038) | 140 | 1000 | 2.82 (45.17) | 0.21 | 0.147 (0.00373) | 165454 | 63921 | 319117 | 2.59 | 2.5 residence volumes* |
| Ex. 14 | 1320 (9101) | 0.018 (0.00046) | 140 | 1000 | 2.77 (44.37) | 0.26 | 0.193 (0.00490) | 177182 | 56480 | 361736 | 3.14 | 3.2 residence volumes* |
| Ex. 15 | 1410 (9712) | 0.022 (0.00056) | 140 | 1000 | 2.79 (44.69) | 0.31 | 0.273 (0.00693) | 183327 | 62585 | 379042 | 2.93 | 4.0 residence volumes* |
| C.S. F | 1310 (9032) | 0.022 (0.00056) | 130 | 0 | 3.46 (55.42) | 0.31 | 0.241 (0.00612) | 131472 | 57352 | 223779 | 2.29 | control @ 130° C. |
| C.S. G | 1320 (9101) | 0.014 (0.00036) | 140 | 0 | 2.70 (43.25) | 0.15 | 0.199 (0.00505) | 132539 | 63907 | 219438 | 2.07 | control @ 140° C. |

*The designations 2.5 residence times, 3.2 residence times and 4.0 residence times refer to the processing period for this formulation. It is the number of 15 minute periods at this condition. It illustrates how much the reaction has influenced the polystyrene properties after the respective process period.

The data summarized in Table 3 shows that the reaction of the poly(sulfonyl azide) and polystyrene caused a significant and unexpected increase in molecular weight properties of the polystyrene. Furthermore, the new molecular weight properties provide a benefit to the foam properties by enhancing the melt strength properties of the gel. This is demonstrated by increases in Mw and Mz measurements for the polystyrene (in the foam) and the increased die gap to maintain comparable die pressure. Also, the cell size and the foam thickness have increased compared to the unmodified polystyrene foam demonstrating increased extensional character as a result of the properties of the modified polystyrene.

Note, the molecular weight increase from the C. S. formulations to the Examples of the invention is comparable to non-foaming studies. It is also shown that the process temperatures for foaming have no influence on the molecular weight of the polystyrene. Furthermore, the increase in foam density at the 140° C. temperature is an indication that the greater molecular weight of the polystyrene modified by the sulfonyl azide results in increased melt tension, and a greater resistance to expansion. This resistance is optionally reduced by increasing the foaming temperature, such that the foam density drops as illustrated by the densities of the two comparative samples, F and G. The data shows the molecu- 3. The process of claim 2 wherein the melt processing device is an extruder.

4. The process or composition of claim 1 wherein at least one poly(sulfonyl azide) has a structure X—R—X wherein each X is $SO_2N_3$ and R represents an unsubstituted or inertly substituted hydrocarbyl, hydrocarbyl ether or silicon-containing group; wherein the poly(sulfonyl azide) has sufficient carbon, oxygen or silicon, atoms to separate the sulfonyl azide groups sufficiently to permit a facile reaction between the vinyl aromatic polymer and the sulfonyl azide; and wherein R includes at least one aryl group between the sulfonyl groups.

5. The process or composition of claim 1 wherein the poly(sulfonyl)azide is selected from 1,5-pentane bis (sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl) hexane, 2,7-naphthalene bis(sulfonyl azide), mixed sulfonyl azides of chlorinated aliphatic hydrocarbons containing an average of from 1 to 8 chlorine atoms and from about 2 to 5 sulfonyl azide groups per molecule, oxy-bis(4-sulfonylazidobenzene), 2,7-naphthalene bis(sulfonyl azido), 4,4'-bis(sulfonyl azido)biphenyl, 4,4'-diphenyl ether bis (sulfonyl azide) and bis(4-sulfonyl azidophenyl)methane and mixtures thereof.

6. The process or composition of claim 1 wherein a substantially uniform admixture of poly(sulfonyl azide) and polymer is formed before exposure to conditions in which chain coupling takes place.

7. The process of claim 1 wherein at least one starting material vinyl aromatic polymer has a molecular weight distribution (Mw/Mn) less than about 20, but greater than about 2.

8. The process of claim 1 wherein the vinyl aromatic polymer has melt flow index of less than about 60 decigrams/minute at 200° C. using a 5 kg weight.

9. A process of increasing the molecular weight of a vinyl aromatic polymer by heating an admixture consisting essentially of at least one vinyl aromatic polymer and a coupling amount of at least about 0.005 to about 2 pph based on the total weight of the vinyl aromatic polymer of at least one poly(sulfonyl azide).

* * * * *